United States Patent
Ohta et al.

(10) Patent No.: US 7,036,074 B1
(45) Date of Patent: Apr. 25, 2006

(54) APPARATUS AND METHOD FOR CONTROLLING DISPLAY OF DATABASE SEARCH ITEMS

(75) Inventors: Yoshinori Ohta, Asaka (JP); Keisuke Tanaka, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/534,309

(22) Filed: Mar. 23, 2000

(30) Foreign Application Priority Data

Mar. 24, 1999 (JP) ................................. 11-079571

(51) Int. Cl.
*G06F 17/18* (2006.01)
*G06F 17/30* (2006.01)

(52) U.S. Cl. ...................... 715/526; 715/530; 715/531; 715/540; 707/3; 707/102

(58) Field of Classification Search ................ 715/526, 715/540, 530, 531; 707/3, 102
See application file for complete search history.

(56) References Cited

U.S. PATENT DOCUMENTS

| | | | | |
|---|---|---|---|---|
| 5,412,774 A | * | 5/1995 | Agrawal et al. ............ 345/804 |
| 5,432,942 A | * | 7/1995 | Trainer ........................ 717/131 |
| 5,781,773 A | * | 7/1998 | Vanderpool et al. ......... 707/100 |
| 5,832,481 A | * | 11/1998 | Sheffield ......................... 707/4 |
| 5,897,622 A | * | 4/1999 | Blinn et al. .................... 705/26 |
| 6,038,566 A | * | 3/2000 | Tsai ............................ 707/102 |
| 6,249,772 B1 | * | 6/2001 | Walker et al. ................. 705/26 |
| 6,301,586 B1 | * | 10/2001 | Yang et al. ............. 707/104.1 |
| 6,421,675 B1 | * | 7/2002 | Ryan et al. ................. 707/100 |
| 6,466,941 B1 | * | 10/2002 | Rowe et al. ................ 707/102 |

* cited by examiner

*Primary Examiner*—Stephen Hong
*Assistant Examiner*—Joshua D Campbell
(74) *Attorney, Agent, or Firm*—McGinn IP Law Group, PLLC

(57) ABSTRACT

Stored in a database are a general-purpose table which contains, on a field-by-field basis, element data corresponding to the fields, an item-mane definition table which stipulates, filed by field an item name for being made to correspond with a database search-item name, and a page definition table storing display-item data for designating the name of an item to be displayed on a display unit. A search item capable of being displayed on a search page is changed by changing the name of the search item in the item-name definition table. The order in which search items are displayed on the search page is changed by changing the order of arrangement of the page definition table. Thus, items which are displayed on the search page of a database are changed.

18 Claims, 17 Drawing Sheets

*Fig. 3*

GENERAL-PURPOSE TABLE

FIELD NAME

| DATA NUMBER | CHARACTER DATA STRING 1 | CHARACTER DATA STRING 2 | ... | CHARACTER DATA STRING 14 | CHARACTER DATA STRING 15 | NUMERIC DATA STRING 1 | ... | NUMERIC DATA STRING 10 | ... | DATE DATA STRING 1 |
|---|---|---|---|---|---|---|---|---|---|---|
| 1 | PRINTER | C-300D | | AAA ELECTRIC CO. | TA SYSTEM | 18000 | | 15600 | | 1997/4/8 |
| 2 | MONITOR | DN40T | | BBB MONITOR CO. | FLAT PANEL | 43000 | | 7200 | | 1998/1/19 |
| ......... | ......... | ......... | | ......... | ......... | ......... | | ......... | | ......... |
| 1000 | | AB-100 | | EE MEDIA CO. | | 400 | | 50000 | | 1997/12/22 |
| 1001 | | C-123 | | FF ELECTRONICS CO. | MEGAPIXEL | 780 | | 8100 | | 1999/2/20 |
| ......... | ......... | ......... | | ......... | ......... | ......... | | ......... | | ......... |

Fig. 4

ITEM-NAME DEFINITION TABLE (BEFORE CHANGE)

| ITEM-NAME NUMBER | ITEM NAME | FIELD NAME |
|---|---|---|
| 1 | PRODUCT CATEGORY | CHARACTER DATA STRING 1 |
| 2 | PRODUCT NAME | CHARACTER DATA STRING 2 |
| ⋮ | ⋮ | ⋮ |
| 9 | MANUFACTURER NAME | CHARACTER DATA STRING 14 |
| 10 | PRODUCT FEATURE | CHARACTER DATA STRING 15 |
| 11 | WEIGHT | NUMERIC DATA STRING 1 |
| ⋮ | ⋮ | ⋮ |
| 21 | NUMBER IN STOCK | NUMERIC DATA STRING 10 |
| ⋮ | ⋮ | ⋮ |
| 24 | SALES DATE | DATE DATA STRING 1 |
| ⋮ | ⋮ | ⋮ |

PAGE DEFINITION TABLE (BEFORE CHANGE)   Fig. 5

| PAGE NUMBER | PAGE NAME | ITEM-NAME NUMBER | ITEM ORDER | DISPLAY TYPE | VALUE |
|---|---|---|---|---|---|
| 1 | ROOT/query | 1 | 1 | TEXT | |
| 1 | ROOT/query | 2 | 2 | TEXT | |
| 1 | ROOT/query | 9 | 3 | LIST | AAA ELECTRIC CO./FFF ELECTRONICS CO./GG INDUSTRIES |
| 1 | ROOT/query | 10 | 4 | TEXT | |
| 1 | ROOT/query | 11 | 5 | TEXT | |
| 1 | ROOT/query | 24 | 6 | TEXT | |
| 2 | ROOT/Entry | 1 | 1 | TEXT | |
| 2 | ROOT/Entry | 2 | 3 | TEXT | |
| 2 | ROOT/Entry | 9 | 2 | TEXT | |
| 2 | ROOT/Entry | 10 | 6 | TEXT | |
| 2 | ROOT/Entry | 11 | 5 | TEXT | |
| 2 | ROOT/Entry | 24 | 4 | TEXT | |
| 3 | ROOT/List | 1 | 1 | TEXT | |
| 3 | ROOT/List | 2 | 3 | TEXT | |
| 3 | ROOT/List | 9 | 2 | TEXT | |
| 3 | ROOT/List | 10 | 4 | TEXT | |
| 3 | ROOT/List | 11 | 6 | TEXT | |
| 3 | ROOT/List | 24 | 5 | TEXT | |

ITEM-NAME DEFINITION TABLE (AFTER CHANGE)  *Fig. 6*

| ITEM-NAME NUMBER | ITEM NAME | FIELD |
|---|---|---|
| 1 | PRODUCT CLASS | CHARACTER DATA STRING 1 |
| 2 | PRODUCT NAME | CHARACTER DATA STRING 2 |
| ⋮ | ⋮ | ⋮ |
| 9 | NAME OF MANUFACTURING COMPANY | CHARACTER DATA STRING 14 |
| 10 | PRODUCT FEATURE | CHARACTER DATA STRING 15 |
| 11 | POUNDAGE | NUMERIC DATA STRING 1 |
| ⋮ | ⋮ | ⋮ |
| 21 | NUMBER IN STOCK | NUMERIC DATA STRING 10 |
| ⋮ | ⋮ | ⋮ |
| 24 | SALES DATE | DATE DATA STRING 1 |
| ⋮ | ⋮ | ⋮ |

Fig. 7

PAGE NAME : ROOT/query

| SET SEARCH CONDITIONS |

SEARCH ALL / ITEM SEARCH

A1

| PRODUCT CATEGORY | PRINTER | MATCH ▼ |
| PRODUCT NAME | | MATCH ▼ |
| MANUFACTURE NAME | AAA ELECTRIC CO. | MATCH ▼ |
| PRODUCT FEATURE | | INCLUDES ▼ |
| WEIGHT | | ~ ▼ | |
| SALES DATE | 1997/1/1 | ~ ▼ | |

JOIN CONDITION ● AND ○ OR — A3

SEARCH — A4

Fig. 8

PAGE NAME : ROOT/query

| SET SEARCH CONDITIONS |

SEARCH ALL / ITEM SEARCH          A1

| PRODUCT CLASS | PRINTER | MATCH ▼ |
| PRODUCT NAME | | MATCH ▼ |
| NAME OF MANUFACTURING COMPANY | AAA ELECTRIC CO. | MATCH ▼ |
| PRODUCT FEATURE | | INCLUDES ▼ |

POUNDAGE [ ] ~ ▼ [ ]
SALES DATE [1997/1/1] ~ ▼ [ ]

JOIN CONDITION ● AND ○ OR    A3

SEARCH   A4

PAGE NAME : ROOT/Entry

PAGE NAME : ROOT/Entry

Fig. 11

PAGE NAME : ROOT/List

| THUMBNAIL IMAGES | PRODUCT CATEGORY | MANUFACTURE NAME | PRODUCT NAME | FEATURE |
|---|---|---|---|---|
| | PRINTER | AAA ELECTRIC CO. | C-300D | TA SYSTEM |
| | CAMERA | AAA ELECTRIC CO. | S-300 | MEGAPIXEL |
| | PRINTER | CC PRINTER CO. | XT-70 | INK JET |
| | PRINTER | DD CO. | NX-500Z | SUBLIMATION |

LIST OF SEARCH RESULTS — A21, A22

GROUP KEYWORD: PRODUCT CATEGORY ▼ (GROUPING)

A10

1/200   BACK — A41

PAGE NAME : ROOT/List

| THUMBNAIL IMAGES | PRODUCT CLASS | NAME OF MANUFACTURING COMPANY | PRODUCT NAME | FEATURE |
|---|---|---|---|---|
| | PRINTER | AAA ELECTRIC CO. | C-300D | TA SYSTEM |
| | CAMERA | AAA ELECTRIC CO. | S-300 | MEGAPIXEL |
| | PRINTER | CC PRINTER CO. | XT-70 | INK JET |
| | PRINTER | DD CO. | NX-500Z | SUBLIMATION |

LIST OF SEARCH RESULTS

GROUP KEYWORD: PRODUCT CATEGORY — GROUPING

1/200 — BACK

PAGE DEFINITION TABLE (AFTER CHANGE)

*Fig. 13*

| PAGE NUMBER | PAGE NAME | ITEM-NAME NUMBER | ITEM ORDER | DISPLAY TYPE | VALUE |
|---|---|---|---|---|---|
| 1 | ROOT/query | 1 | 3 | TEXT | |
| 1 | ROOT/query | 2 | 1 | TEXT | |
| 1 | ROOT/query | 9 | 2 | LIST | AAA ELECTRIC CO./FFF ELECTRONICS CO./GG INDUSTRIES |
| 1 | ROOT/query | 10 | 4 | TEXT | |
| 1 | ROOT/query | 11 | 5 | TEXT | |
| 2 | ROOT/Entry | 1 | 1 | TEXT | |
| 2 | ROOT/Entry | 2 | 2 | TEXT | |
| 2 | ROOT/Entry | 9 | 3 | TEXT | |
| 2 | ROOT/Entry | 10 | 5 | TEXT | |
| 2 | ROOT/Entry | 11 | 4 | TEXT | |
| 3 | ROOT/List | 1 | 2 | TEXT | |
| 3 | ROOT/List | 2 | 4 | TEXT | |
| 3 | ROOT/List | 9 | 1 | TEXT | |
| 3 | ROOT/List | 10 | 3 | TEXT | |
| 3 | ROOT/List | 11 | 5 | TEXT | |

Fig. 14

PAGE NAME : ROOT/query

SET SEARCH CONDITIONS

SEARCH ALL | ITEM SEARCH            — A1

| PRODUCT NAME | | MATCH ▼ |
| MANUFACTURE NAME | AAA ELECTRIC CO. | MATCH ▼ |
| PRODUCT CATEGORY | PRINTER | MATCH ▼ |
| PRODUCT FEATURE | | INCLUDES ▼ |
| WEIGHT | ~ ▼ | |

JOIN CONDITION ● AND ○ OR  — A3

SEARCH  — A4

PAGE NAME : ROOT/Entry

Fig. 16

PAGE NAME : ROOT/List

| LIST OF SEARCH RESULTS — A21, A22 | | | | |
|---|---|---|---|---|
| GROUP KEYWORD: PRODUCT CATEGORY ▼  (GROUPING) | | | | |
| A10 | | | | |
| THUMBNAIL IMAGES | MANUFACTURE NAME | PRODUCT CATEGORY | FEATURE | PRODUCT NAME |
| 〔printer image〕 | AAA ELECTRIC CO. | PRINTER | TA SYSTEM | C-300D |
| 〔camera image〕 | AAA ELECTRIC CO. | CAMERA | MEGAPIXEL | S-300 |
| 〔printer image〕 | CC PRINTER CO. | PRINTER | INK JET | XT-70 |
| 〔printer image〕 | DD CO. | PRINTER | PHOTO-GRAPHIC | NX-500Z |

⏮ ◀ 1/200 ▶ ⏭   (BACK)

A35 A34 A31 A32   A33   A41

APPARATUS AND METHOD FOR CONTROLLING DISPLAY OF DATABASE SEARCH ITEMS

BACKGROUND OF THE INVENTION

1. Field of the Invention

This invention relates to an apparatus and method for controlling the display of search items involving a database (inclusive of a display prior to searching the database and a display of search results after searching the database).

2. Description of the Related Art

Generally a database is created by designing tables constructed within the database and configuring a scheme that is in line with a specific task. Redundancy of data is improved by the structure of such a database.

However, since the scheme conforms to the specific task alone, it is difficult to apply the database to other tasks. The database must be redesigned, therefore, if it is to be applied to another task.

Further, since changes or additions to the names of search items in a database involve changing the database per se, this is inevitably carried out by an expert having thorough knowledge of databases. A user who is not accustomed to handling databases will find difficulty in changing or adding to the names of search items.

DISCLOSURE OF THE INVENTION

Accordingly, an object of the present invention is to arrange it so that even a user not accustomed to handling databases can make changes or additions to the search items of a database in a comparatively simple manner.

According to the present invention, the foregoing object is attained by providing an apparatus for controlling display of database search items, comprising: a database storing an element-data storage table in which has been stored, on a field-by-field basis, element data corresponding to the fields, an item-name table which stipulates, field by field, an item name for being made to correspond with a database search-item name, and a display-item designation table in which display-item data for designating an item name to be displayed on a display unit has been stored; a select-command input unit (select-command input means) for applying a select command for designating a display item; a display-item data read-out unit (display-item data read-out means) for reading out, from the display-item designation table, the display-item data that conforms to the select command applied by the select-command input unit; an item-name read-out unit (item-name read-out means) for reading out, from the item-name table, an item name to be displayed on the display unit, the item name being designated by the display-item data read out by the display-item data read-out unit; and a display control unit (display control means) for displaying an item name, which has been read out by the item-name read-out unit, on the display unit as a database search-item name.

The present invention provides also a method suitable for the apparatus described above. Specifically, the present invention provides a method of controlling display of search items of a database storing an element-data storage table in which has been stored, on a field-by-field basis, element data corresponding to the fields, an item-name table which stipulates, field by field, an item name for being made to correspond with a database search-item name, and a display-item designation table in which display-item data for designating an item name to be displayed on a display unit has been stored, the method comprising the steps of: applying a select command for designating a display item; reading out, from the display-item designation table, the display-item data that conforms to the select command applied; reading out, from the item-name table, an item name to be displayed on the display unit, the item name being designated by the display-item data read out; and displaying an item name, which has been read out, on the display unit as a database search-item name.

In accordance with the present invention, the above-mentioned element-data storage table, item-name table and display-item designation table are stored in the database. When the select command is applied, the display-item data conforming to the select command is read out of the display-item designation table. When the display-item data is read out, an item name specified by the display-item data that has been read out is read out of the item-name table. The item name read out is displayed on the display unit as the name of a search item in the database.

In a case where a database search is conducted, a value corresponding the name of a database search item displayed on the display unit is entered. Results obtained by the database search are displayed on the display unit.

By entering change-targeted item-name data, which represents a change-targeted item name for changing the name of an item specified in the item-name table, as well as item-name change data, which represents the name of an item after a change, an item name decided by the entered change-targeted item-name data, which is among the item names specified in the item-name table, is changed to an item name represented by the item-name change data.

Further, if data representing an additional item name for adding an item name specified in the item-name table is entered, then the additional item name represented by the entered additional-item-name data will be stored in the item-name table in association with the field.

Thus, by adding or changing an item name that has been stored in the item-name table, an item name capable of being displayed on the display unit can be added on or changed.

Furthermore, if display-item change data for changing the display-item data that has been stored in the display-item designation table is entered, then the display-item data that has been stored in the display-item designation table will be changed in accordance with the entered display-item change data.

Furthermore, by entering display-item add-on data for adding on the display-item data that has been stored in the display-item designation table, the display-item data stored in the display-item designation table will be added on in accordance with the entered display-item add-on data.

An item name displayed on the display unit can be added on or changed.

Data specifying the order in which search items are to be displayed can also be stored in the display-item designation table. This will also make possible a situation in which the order of the search-item display can be changed.

Thus, even a user not accustomed to handling databases can change the names of items displayed on the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates the details of the general-purpose table;

FIG. 4 illustrates the details of the item-name definition table before a change;

FIG. 5 illustrates the details of the page definition table;

FIG. 6 illustrates the details of the item-name definition table after a change;

FIGS. 7 to 12 illustrate examples of HTML search pages displayed on the display unit of a client computer;

FIG. 13 illustrates the details of the page definition table;

FIGS. 14 to 16 show examples of HTML search pages displayed on the display unit of the client computer.

DESCRIPTION OF THE PREFERRED EMBODIMENTS

A preferred embodiment of the present invention will now be described in detail with reference to the drawings.

Figure 1:
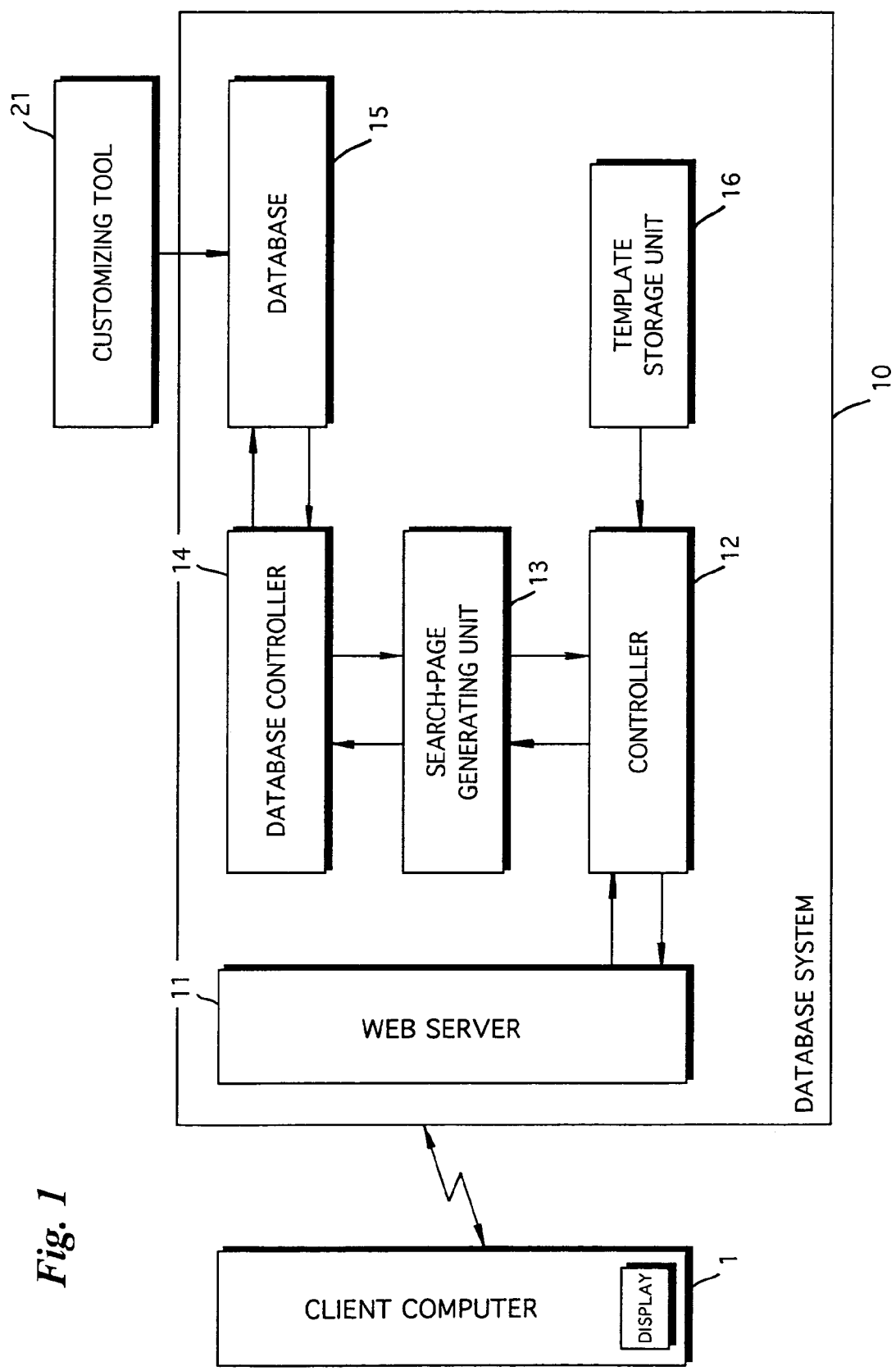
FIG. 1 is a block diagram illustrating the electrical construction of a data communication system.

FIG. 1 illustrates a data communication system according to a preferred embodiment of the present invention.

The data communication system comprises a client computer 1 and a database system 10 capable of communicating with each other via a network such as the Internet. The client computer 1 includes a display unit, and the database system 10 includes a Web server 11. The Web server 11 includes a CPU, a memory, a CD-ROM drive, a display unit and so on.

The database system 10 further includes an HTML (HyperText Markup Language) template storage unit 16 in which data representing a template for displaying an HTML search page has been stored; a database 15 for storing various data; a database controller 14 for searching various data that has been stored in the database 15; a search-page generating unit 13 for generating the HTML page data (inclusive of a page for inputting search criteria, a page for displaying search results and a page for inputting data to the database); and a controller 12 for controlling the overall operation of the database system 10.

A general-purpose table (element-data storage table), item-name definition table (item-name table) and page definition table (display-item designation table) have been stored in the database 15, as will be described later. In order to change the content of each table stored in the database 15, a customizing tool (constituted by a computer, keyboard, mouse and monitor, etc.) 21 has been connected to the database system 10.

Though the database system 10 and customizing tool 21 are illustrated as being implemented by hardware in FIG. 1, software implementation may be adopted as necessary.

Figure 2:
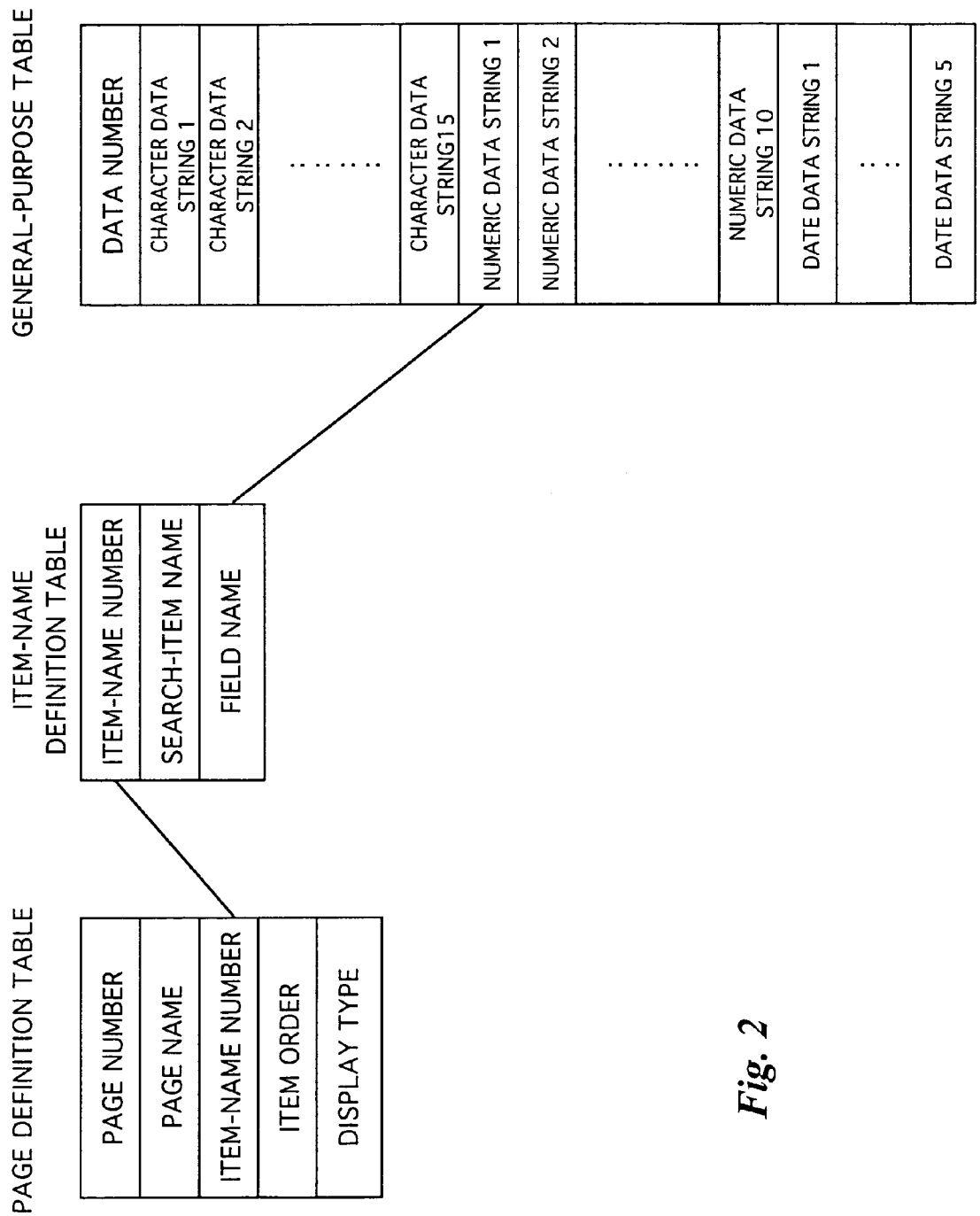
FIG. 2 illustrates an overview of a page definition table, item-name definition table and general-purpose table that have been stored in a database.

FIG. 2 illustrates an overview of the tables that have been stored in the database 15 included in database system 10.

The database 15 stores the general-purpose table, item-name definition table and page definition table, as mentioned above.

Element data, which is data that is the object of a search, has been stored in the general-purpose table per character data string, numeric data string and date data string. The character data string, numeric data string and date data string are of numerous types and element data composed of a character string, element data composed of numerals and element data composed of dates is stored in the table in conformity with the type of data string. Data numbers are also stored in the general-purpose table in order to identify the element data.

An item-name number, search-item name and field name have been stored in the item-name definition table. The search-item name is an item name displayed on the database search page, and the item-name number is a number for identifying a search-item name. The field name is for specifying a character data string, numeric data string and date data string that have been stored in the general-purpose table. The item-name definition table and general-purpose table are associated with each other by the field name.

A page number, page name, item-name number, order of the items and display type have been stored in the page definition table. The page number specifies the search page to be displayed. The page name indicates the name of the search page to be displayed. The order of the items indicates the order in which the search items are displayed on an HTML search page. The display type indicates the display type of a search item displayed on the HTML search page.

The page definition table and the item-name definition table area associated with each other by the item-name number.

FIG. 3 illustrates the details of the general-purpose table.

For each string (field) specified by a field name (character data strings 1, 2, . . . , 14, 15, numeric data strings 1, . . . , 10 and date string 1, etc.), element data corresponding to the string has been stored in the general-purpose table. Element data (printer, monitor, cable, camera, etc.) corresponding to product category has been stored in character data string 1. Element data (C-300D, DN40T, AB-100, C-123, etc.) corresponding to a product name has been stored in character data string 2. Element data (AAA Electric Co., BBB Monitor Co., EE Media Co., FF Electronics Co., etc.) corresponding to a manufacturer name has been stored in character data string 14. Element data (TA system, flat panel, megapixel, etc.) corresponding to product features has been stored in the character data string 15. Element data (18000, 43000, etc.) corresponding to the weight of a product has been stored in the numeric data string 1. Element data (15600, 7200, etc.) corresponding to the number of the items of a product in stock has been stored in the numeric data string 10. Element data (1997/4/8, 1998/1/19, etc.) corresponding to the sales date of a product has been stored in the date data string 1.

The set of the items of element data on one line is identified by the data number.

FIG. 4 shows the details of the item-name definition table. A search item capable of being displayed on an HTML search page is stipulated by this item-name definition table.

An item name has been assigned in correspondence with each field name. Since element data indicating product category has been stored in the character data string 1 of the general-purpose table, as mentioned above, "PRODUCT CATEGORY" has been assigned as the item name that matches this element data. Item names conforming to the content of element data that has been stored in respective data strings of the general-purpose table are assigned in similar fashion as the other item names.

Unique item-name numbers have been assigned in order to identify these item names and field names.

FIG. 5 shows the details of the page definition table. This table stipulates search items displayed on an HTML search page and the order in which these search items are arranged.

Search items decided by item-name numbers having the same page number (page name) are displayed on an HTML search page. For example, since "1, 2, 9, 10, 11, 24" are the item-name numbers on page number 1, the following are displayed as the names of search items on the HTML search page represented by page number 1: the item name "PRODUCT CATEGORY" stipulated by item-name number 1, the item name "PRODUCT NAME" stipulated by item-name number 2, the item name "MANUFACTURER NAME" stipulated by item-name number 9, the item name "PRODUCT FEATURE" stipulated by item-name number 10, the item name "WEIGHT" stipulated by item-name number 11, and the item name "SALES DATE" stipulated by item-name number 24.

The order in which the search items are displayed on the search page is in accordance with the sequence of the numerals stipulated by the order of the items. The items are displayed in the following order, which is in order of increasing numerals: search item stipulated by item-name number 1, search item stipulated by item-name number 2, search item stipulated by item-name number 9, search item stipulated by item-name number 10, search item stipulated by item-name number 11 and search item stipulated by item-name number 24. Accordingly, the order is "PRODUCT NAME", "MANUFACTURER NAME", "PRODUCT FEATURE", "WEIGHT" and "SALES DATE".

In FIG. 5, "TEXT" or "LIST" is the display type. "TEXT" displays a search item of a type for which a value corresponding to a search item is to be input. "LIST" displays, in a list format, values corresponding to search items. In the example depicted in FIG. 5, the display format of the search item "MANUFACTURER NAME" specified by item-name number 9 is "LIST", and "AAA ELECTRIC CO./FFF ELECTRONICS CO./GG INDUSTRIES" have been stored as the values. By pulling down a menu, "AAA ELECTRIC CO./FFF ELECTRONICS CO./GG INDUSTRIES" will displayed on the display screen of the display unit under the search item "MANUFACTURER NAME" on the HTML search page.

Likewise, for search pages designated by page numbers 2 and 3, the search items decided by the item-name numbers are displayed in accordance with the display type in the order of the items in a manner similar to that of the search page designated by page number 1.

By virtue of the fact that the database 15 stores each of the tables shown in FIGS. 2 to 5, an item name displayed on an HTML search page can be changed by changing the item name that has been stored in the item-name definition table.

FIG. 6 illustrates an example of the item-name definition table.

The content of the item-name definition table of FIG. 6 has been changed in comparison with that of the item-name definition table shown in FIG. 4. Specifically, the item name stipulated by item name number 1 has been changed from "PRODUCT CATEGORY" to "PRODUCT CLASS", the item name stipulated by item name number 9 has been changed from "MANUFACTURER NAME" to "NAME OF MANUFACTURING COMPANY", and the item name stipulated by item name number 11 has been changed from "WEIGHT" to "POUNDAGE".

By changing the item-name definition table in the manner shown in FIG. 6, the search items displayed on the HTML search page are changed.

FIG. 7 illustrates an example of an HTML search page displayed on the display unit of the client computer 1.

The HTML search page shown in FIG. 7 is identified by page number 1 (Page Name: ROOT/query).

The HTML search page includes the following areas:
Search-Item Display Area A1:
The area displays search items as well as areas for making inputs or selections in conformity with the search items. The HTML search page shown in FIG. 7 is displayed in accordance with the item-name definition table illustrated in FIG. 4 and page definition table shown in FIG. 5. The names of search items are displayed in the order "PRODUCT CATEGORY", "PRODUCT NAME", "MANUFACTURER NAME", "PRODUCT FEATURE", "WEIGHT" and "SALES DATE".

Join-Condition Designating Area A3:
This is an area for designating a join condition that has been entered in a search item.

Search Area A4:
This is an area clicked by the user of the client computer 1 when a search command is transmitted from the client computer 1 to the database system 10.

By changing the item-name definition table from the table shown in FIG. 4 to the table shown in FIG. 6, the HTML search page displayed on the display unit of the client computer 1 changes in the manner shown in FIG. 8.

In the HTML search page shown in FIG. 8, the search item displayed in the search-item display area A1 has changed in accordance with the item-name definition table illustrated in FIG. 6. As mentioned above, the item-name definition table illustrated in FIG. 6 is such that the item name stipulated by item name number 1 has been changed from "PRODUCT CATEGORY" to "PRODUCT CLASS", the item name stipulated by item name number 9 has been changed from "MANUFACTURER NAME" to "NAME OF MANUFACTURING COMPANY", and the item name stipulated by item name number 11 has been changed from "WEIGHT" to "POUNDAGE". As a result, the HTML search page shown in FIG. 8 also is such that the search items displayed in the search-item display area A1 have changed from "PRODUCT CATEGORY" to "PRODUCT CLASS", from "MANUFACTURER NAME" to "NAME OF MANUFACTURING COMPANY" and from "WEIGHT" to "POUNDAGE".

Thus, by changing the item names contained in the item-name definition table, the search items displayed on the HTML search page are changed.

Figure 9:
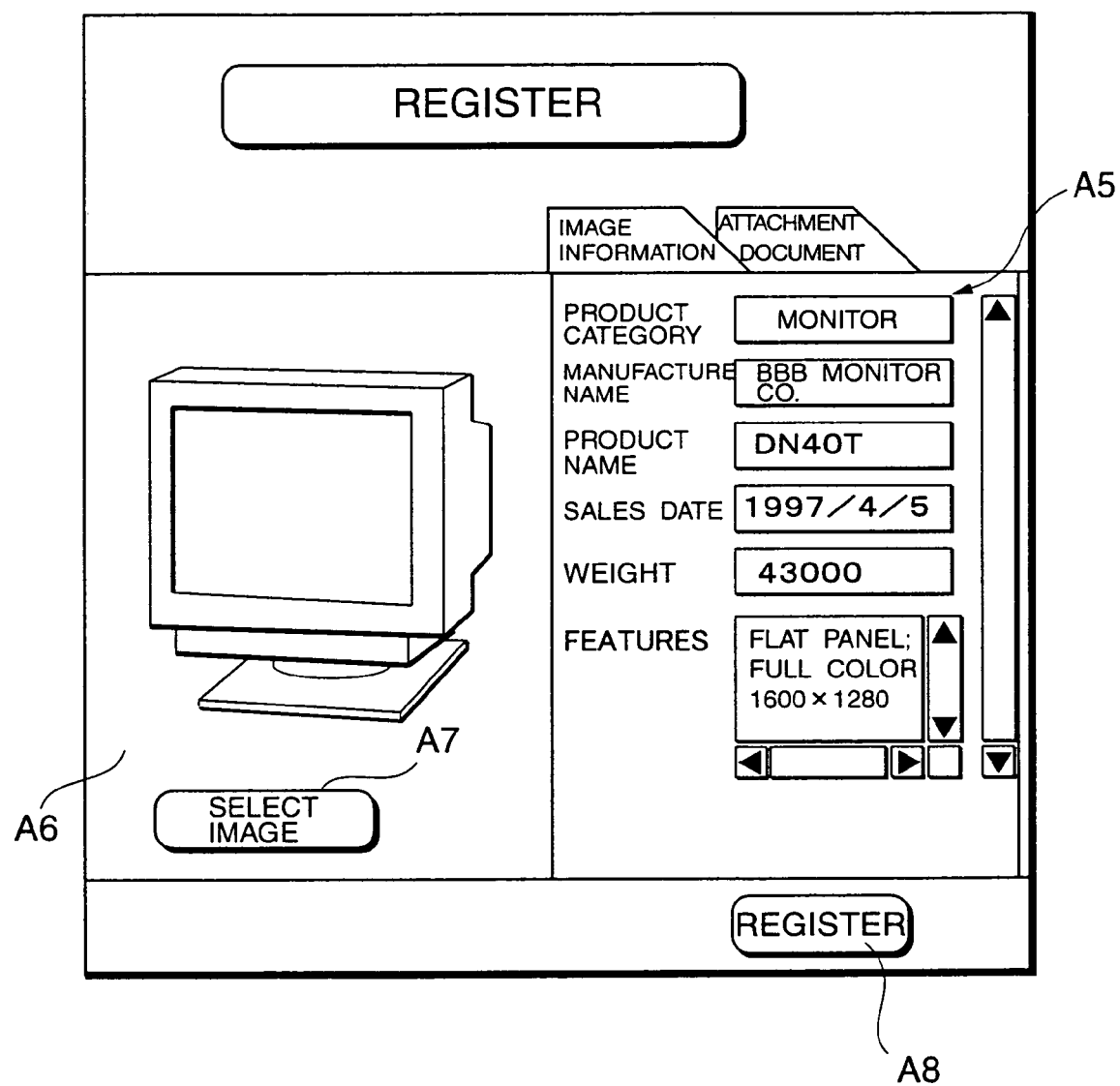

FIG. 9 illustrates an example of an HTML search page specified by page number 2 (Page Name: ROOT/Entry). This diagram is an HTML search page displayed on the display unit of the client computer 1 when each item of data is registered with the database 15.

The HTML search page shown in FIG. 9 includes the following areas:
Search-Item Display Area A5:
This area displays search items for setting data; it includes area for entering setting data as well.

Image Display Area A6:
This is an area which displays an image representing a product.

Image Selection Area A7:
This area is clicked by the user of the client computer 1 when an image displayed in the image display area A6 is selected.

Registration Area A8:
This area is clicked by the user of the client computer 1 when a search item that has been set in the search-item display area A5 is registered with the database 15.

Figure 10:
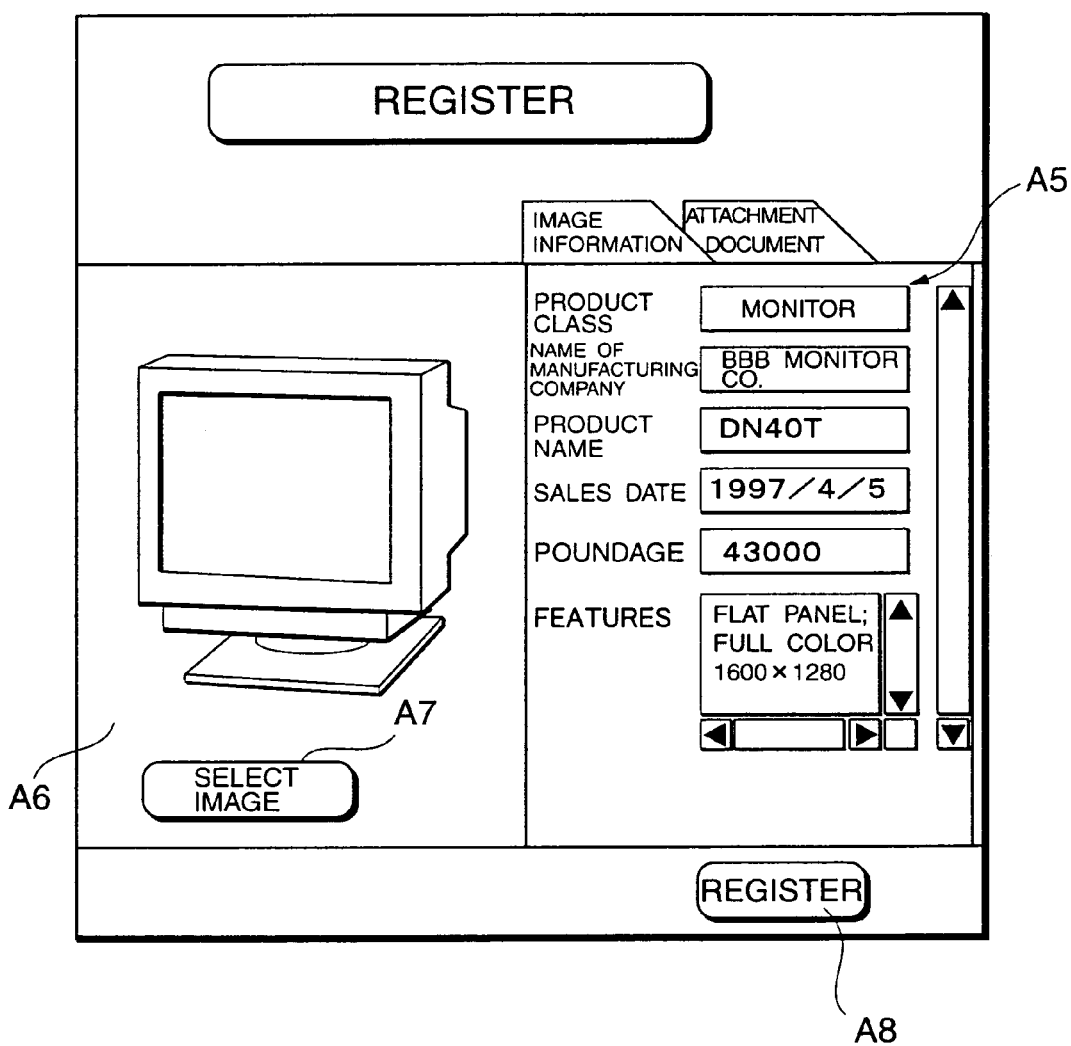

The search items decided by the item-name definition table shown in FIG. 4 are displayed in the search-item display area A5. By changing the item-name definition table shown in FIG. 4 to the item-name definition table shown in FIG. 6, the HTML search page shown in FIG. 9 becomes the HTML search page shown in FIG. 10, and the search items displayed in the search-item display area A5 and the order of arrangement thereof change.

FIG. 11 shows an HTML search page which displays a list of search results. This is a page which appears when data obtained by searching the database 15 is displayed on the display unit of the client computer 1.

This HTML search page includes the following areas:

Group Keyword Input Area A21:

This is an area in which a group keyword is entered in a case where a search of the database 15 is conducted by applying a group keyword.

Grouping Area A22:

This is an area clicked by the user of the client computer 1 when a command to search the database 15 is applied to the database system 10 by providing a group keyword.

Search-Result Display Area A10:

This is an area in which search results obtained by searching the database 15 are displayed item name by item name. The items displayed in search-result display area A10 also are stipulated by the item-name definition table. The item names displayed in the search-result display area A10 are changed by changing the item names in the item-name definition table.

Page Display Area A31:

This area indicates the number of the HTML search page being displayed.

Single-Page Advance Area A32:

When an HTML search page being displayed is to be advanced by one page, this area is clicked by the user of the client computer 1.

Plural-Page Advance Area A33:

When an HTML search page being displayed is to be advanced by a plurality of pages, this area is clicked by the user of the client computer 1.

Single-Page Return Area A34:

When an HTML search page being displayed is to be turned back by one page, this area is clicked by the user of the client computer 1.

Plural-Page Return Area A35:

When an HTML search page being displayed is to be turned back by a plurality of pages, this area is clicked by the user of the client computer 1.

By changing the names of items in the item-name definition table, the search items being displayed in the search-result display area A10 shown in FIG. 11 are changed in the manner shown in FIG. 12.

FIG. 13 illustrates an example of the page definition table.

In comparison with the page definition table illustrated in FIG. 5, the page definition table shown in FIG. 13 is such that the page number, page name, order of the item name and display type specified by the item-name number 24 have been deleted. The order of the items also has been changed.

By changing the page definition table from that shown in FIG. 4 to that shown in FIG. 13, the search item "SALES DATE" stipulated by item-name number 24 is deleted from the search items included on the HTML search page shown in FIG. 7 specified by page number 1, as illustrated in FIG. 14.

Further, the order in which the items are arranged is changed so that the new order is "PRODUCT NAME", "MANUFACTURER NAME", "PRODUCT CATEGORY", "PRODUCT FEATURE" and "WEIGHT" decided by the page definition table of FIG. 13.

Figure 15:
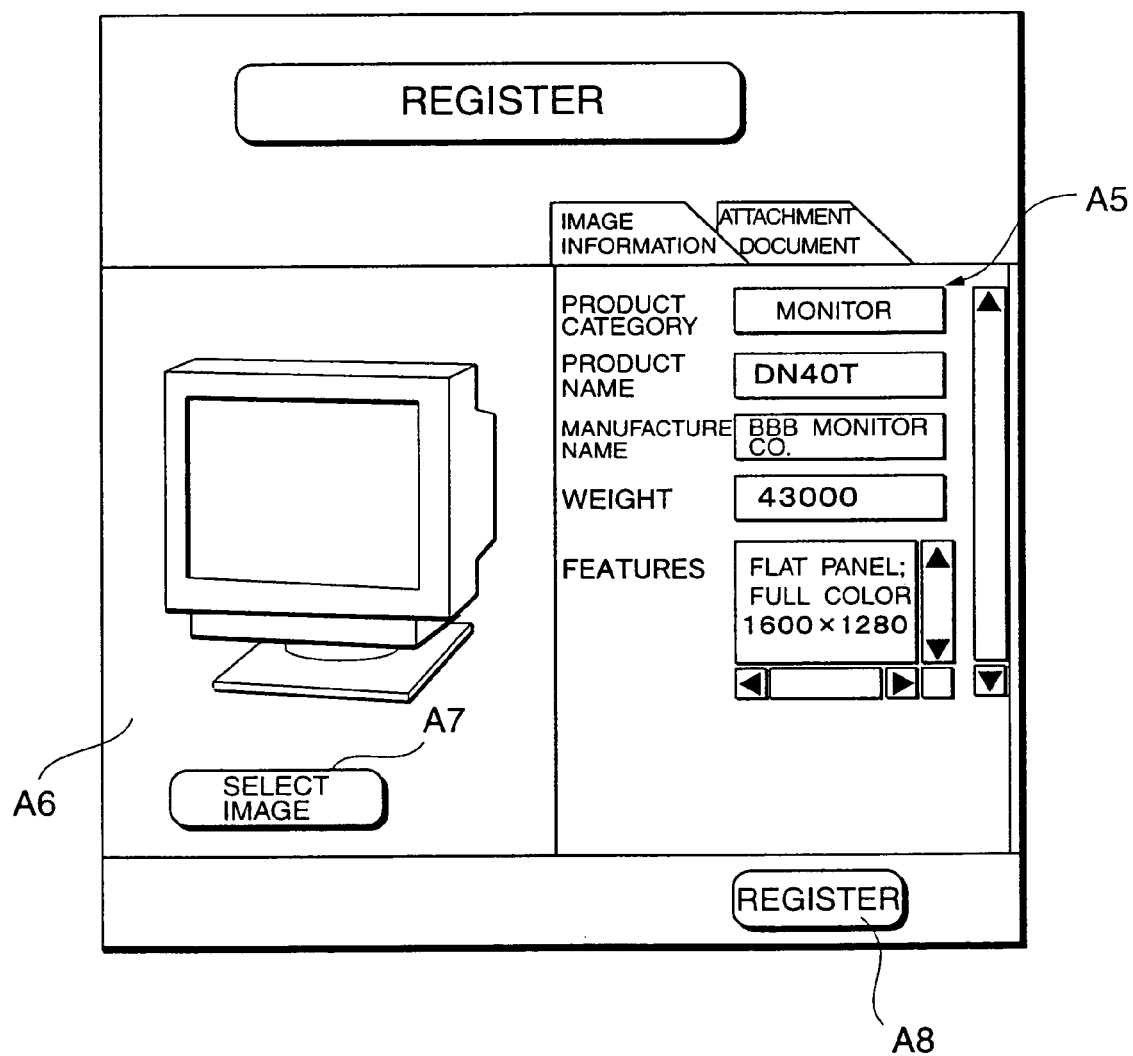

The search item "SALES DATE" stipulated by item-name number 24 is deleted also from the HTML search page shown in FIG. 9 specified by page number 2, as illustrated in FIG. 15. The order in which the items are arranged also is changed so that the new order is "PRODUCT CATEGORY", "PRODUCT NAME", "MANUFACTURER NAME", "WEIGHT" and "PRODUCT FEATURE", as stipulated by the page definition table of FIG. 13.

Similarly, with regard also to the HTML search page shown in FIG. 11 specified by page number 3, the order in which the items are arranged is changed so that the new order is "MANUFACTURER NAME", "PRODUCT CATEGORY", "PRODUCT FEATURE", "PRODUCT NAME" and "WEIGHT", as stipulated by the page definition table of FIG. 13.

By deleting data that has been stored in the page definition table, search items displayed on an HTML search page can be deleted. Similarly, by adding new data to the page definition table, new search items can be displayed on an HTML search page. In addition, by changing the order of items in the page definition table, the order of search items displayed on an HTML search page can be changed.

It goes without saying that change and deletion of data that has been stored in the item-name definition table or page definition table is carried out by applying the command as well as the data for change and deletion to the database 15 from the custom tool that has been connected to the database system 10.

Figure 17:
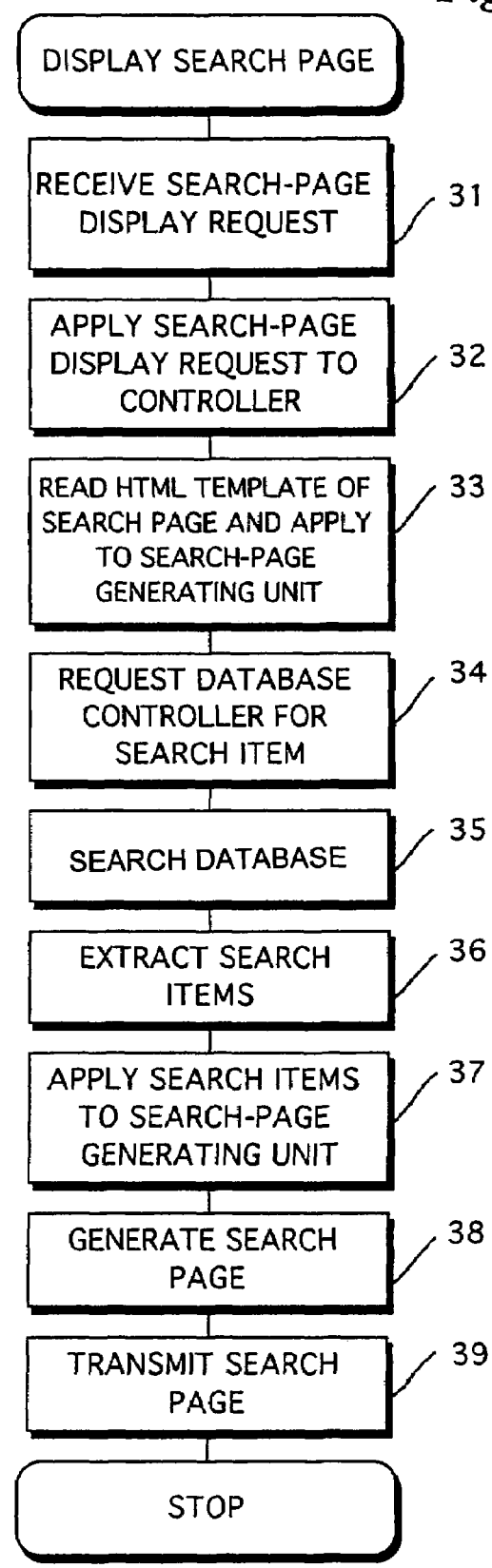
FIG. 17 is a flowchart illustrating a procedure for displaying a search page.

FIG. 17 is a flowchart illustrating processing for displaying an HTML search page on the display unit of the client computer 1.

First, a request to display a search page is transmitted from the client computer 1 to the database system 10. The request for display of the search page is received by the Web server 11 of the database system 10 (step 31). Next, the Web server 11 applies the search-page display request to the controller 12 (step 32). In response, an HTML template conforming to the request that has been transmitted from the client computer 1 is read out of the HTML template storage unit 16 by the controller 12. The read template is applied to the search-page generating unit 13 (step 33).

Further, the controller 12 applies a search-item request command to the database controller 14 via the search-page generating unit 13 (step 34). The item-name definition table and the page definition table are searched in accordance with the search-item request command (step 35). The search items to be displayed on the HTML search page are extracted from the database 15 by the database controller 14 (step 36).

The extracted search items are applied to the search-page generating unit 13 from the database controller 14 (step 37). The HTML search page is generated in the search-page generating unit 13 in such a manner that the search items that have been read out of the database 15 will be displayed in the template read out of the HTML template storage unit 16 (step 38). The generated HTML search page is applied to the Web server 11, which proceeds to transmit the HTML search page to the client computer 1 (step 39).

Thus, as described above, HTML search pages of the kind shown in FIGS. 9 to 12 and FIGS. 14 to 16 are displayed on the display unit of the client computer 1. Thus, even a user not accustomed to handling databases is capable of changing search display items.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling display of database search items, comprising:
   a database including:
      an element-data storage table in which has been stored, on a field-by-field basis, element data corresponding to the fields;
      an item-name table which stipulates, field-by-field, an item name character that corresponds to a search-item name and a field name; and
      a display-item designation table that stores ordered display-item data corresponding to said item name character for an ordered display on a display unit, the ordered display being determined by a user;
   a select-command input device for applying a select command for designating the ordered display-item data;
   a display-item data read-out device for reading out, from the display-item designation table, the ordered display-item data that conforms to the select command applied by said select-command input device;
   a search-item name read-out device for reading out, from the item-name table, said search-item name to be displayed on the display unit, said search-item name being designated by the ordered display-item data read out by said display-item data read-out device;
   a display control unit for displaying said search-item name, which has been read out by said search-item name read-out device, on the display unit as a database search-item name; and
   a customizing tool for changing search items displayed on a search page by inputting at least one of:
      change-targeted item-name data for changing a search-item name in the item-name table;
      data representing an additional search-item name for adding a search-item name to the item-name table;
      display-item change data for changing a display-item in the display-item designation table; and
      display-item add-on data for adding on a display-item to the display item designation table.

2. The apparatus according to claim 1, wherein said customizing tool comprises:
   a change-data input device for inputting said change-targeted item-name data, which represents a change-targeted item name for changing the name of an item that has been stipulated in the item-name table, and item name change data representing the name of an item after a change; and
   an item-name changing device for changing, to the name of an item represented by the item-name change data, an item name decided by the change-targeted item name data, which is among the item names specified in the item-name table, input from said change-data input device.

3. The apparatus according to claim 1, wherein said customizing tool comprises:
   an additional-item-name data input device for inputting said data representing an additional item name which adds on an item name specified in the item-name table; and
   an item-name add-on device for storing an additional item name, which is represented by additional-item-name data that has been input from said additional-item-name data input device, in the item-name table in correspondence with the field.

4. The apparatus according to claim 1, wherein said customizing tool comprises:
   a display-item change-data input device for inputting said display-item change data for changing a display-item that has been stored in the display-item designation table; and
   a device for changing the ordered display-item data, which has been stored in the display-item designation table, in accordance with display-item change data that has been input from said display-item change-data input device.

5. The apparatus according to claim 1, wherein said customizing tool comprises:
   a display-item add-on data input device for inputting said display-item add-on data for adding on the ordered display-item data that has been stored in the display item designation table; and
   a device for adding on the ordered display-item data stored in the display-item designation table in accordance with the display-item add-on data that has been input from said display-item add-on data input device.

6. A method of controlling display of search items of a database including an element-data storage table in which has been stored, on a field-by-field basis, element data corresponding to the fields, an item-name table which stipulates, field-by-field, an item name character that corresponds to a search-item name and a field name, and a display-item designation table that stores ordered display-item data corresponding to said item name character for an ordered display determined by a user on a display unit, the method comprising:
   applying a select command for designating the ordered display-item data;
   reading out, from the display-item designation table, the ordered display-item data that conforms to the select command applied;
   reading out, from the item-name table, a search-item name to be displayed on the display unit, the search-item name being designated by the ordered display-item data read out;
   displaying the search-item name, which has been read out, on the display unit as a database search-item name in an ordered display determined by a user; and
   changing search items displayed on a search page by using a customizing tool, said changing said search items comprising at least one of:
      inputting change-targeted item-name data for changing a search-item name in the item-name table;
      inputting data representing an additional search-item name for adding a search-item name to the item-name table;
      inputting display-item change data for changing a display-item in the display-item designation table; and
      inputting display-item add-on data for adding on a display-item to the display-item designation table.

7. The apparatus according to claim 1, wherein said customizing tool comprises:
   a change-data input device for inputting said change targeted item-name data, which represents a change targeted item name for changing the name of an item that has been stipulated in the item-name table, and item name change data representing the name of an item after a change.

8. The apparatus according to claim 1, wherein said customizing tool comprises:

an additional-item-name data input device for inputting said data representing an additional item name which adds on an item name specified in the item-name table.

9. The apparatus according to claim 1, wherein said customizing tool comprises:

a display-item change-data input device for inputting said display-item change data for changing a display-item that has been stored in the display-item designation table.

10. The apparatus according to claim 1, wherein said customizing tool comprises:

a display-item add-on data input device for inputting said display-item add-on data for adding on the ordered display-item data that has been stored in the display item designation table.

11. The apparatus according to claim 1, further comprising:

a database system which includes said database, said database system further comprising:

a hypertext markup language (HTML) template storage unit for storing data representing a template for displaying said search page.

12. The apparatus according to claim 11, wherein said database system is in communication with a client computer for performing a search of said database via the Internet.

13. The apparatus according to claim 11, wherein said database system and said customizing tool comprise a software-implemented database system and a software-implemented customizing tool, respectively.

14. The apparatus according to claim 13, wherein said database system further comprises:

a database controller for controlling searches of data stored in said database.

15. The apparatus according to claim 14, wherein said database system further comprises:

a search page generating unit for generating HTML page data for said search page.

16. The apparatus according to claim 15, wherein said HTML page data comprises data representing a page for inputting search criteria, data representing a page for displaying search results, and data representing a page for inputting data to said database.

17. The apparatus according to claim 15, wherein said database system further comprises:

a controller for controlling an operation of said database system.

18. The apparatus according to claim 17, wherein said database system further comprises:

a Web server in communication with said controller.

* * * * *